United States Patent

Beeler

Patent Number: 5,439,069
Date of Patent: Aug. 8, 1995

[54] NESTED CART PUSHER

[76] Inventor: Jimmy A. Beeler, 2867 Cedar St., Sutter, Colo. 95982

[21] Appl. No.: 214,671

[22] Filed: Mar. 18, 1994

Related U.S. Application Data

[63] Continuation of Ser. No. 932,226, Nov. 27, 1992, abandoned.

[51] Int. Cl.⁶ .............................................. B62D 5/04
[52] U.S. Cl. ..................................... 180/11; 180/19.1; 280/510; 280/33.991
[58] Field of Search .................. 180/15, 16, 19.1, 19.2, 180/19.3, 14.1, 21, 22, 209, 907, 11; 280/33.991, 33.992, 504, 510

[56] References Cited

U.S. PATENT DOCUMENTS

| | | | |
|---|---|---|---|
| 2,200,654 | 5/1940 | Ruhl | 280/510 |
| 2,409,831 | 10/1946 | Brodale | 280/510 |
| 2,749,996 | 6/1956 | Parker et al. | 180/15 X |
| 3,905,437 | 9/1975 | Kaiho et al. | 180/15 |
| 4,484,755 | 11/1984 | Houston | 280/33.992 |
| 4,771,840 | 9/1988 | Keller | 280/33.992 X |
| 5,082,074 | 1/1992 | Fischer | 280/33.991 X |
| 5,322,306 | 6/1994 | Coleman | 280/33.991 X |

FOREIGN PATENT DOCUMENTS

| | | | |
|---|---|---|---|
| 2350308 | 4/1975 | Germany | 280/33.991 |
| 2450692 | 4/1976 | Germany | 280/33.991 |

*Primary Examiner*—Brian L. Johnson
*Assistant Examiner*—Michael Mar
*Attorney, Agent, or Firm*—Terrance L. Siemens

[57] ABSTRACT

A powered pusher vehicle for moving a train of nested shopping carts, the vehicle having a main body portion with a central drive wheel powered by an electric motor through a worm gear transmission. Caster wheels support one end of the vehicle for ease of steering and easy manipulation of the pusher vehicle when it is not connected to the carts. A pair of normally raised wheels, on each side of the drive wheel, may be lowered to raise the drive wheel from the ground. A remote control allows the operator to manually guide the lead cart while controlling speed of the pusher vehicle with the remote control. The vehicle includes a pair of latch members for automatically connecting the front of the vehicle to a rearmost one of the nested carts. The arrangement permits a single person to manipulate a long train of nested shopping carts with ease.

5 Claims, 3 Drawing Sheets

NESTED CART PUSHER

CROSS REFERENCE TO RELATED APPLICATION

This application is a continuation of application Ser. No. 07/932,226, filed Nov. 27, 1992, now abandoned.

BACKGROUND OF THE INVENTION

1. Field of the Invention

The present invention relates to a pushing vehicle for nested shopping carts. More specifically, it relates to an improved pushing vehicle with remote control capability and unique safety and operational features. More generally the vehicle of this invention could be used to provide motive power for any type of sled, cart, wagon, or wheelbarrow. For example, it could be used to assist the difficult hand pushing of concrete carrying wheelbarrows at construction sites. As another example, the vehicle of this invention could be used to position heavy palletized loads on the bed of a truck or in the hold of a ship.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Devices for pulling non-powered vehicles such as trailers are old and well known in the art. The trailer hitch art and the art of tractor-trailer combinations is well developed. Less common, but not unknown, is prior art pertaining to the pushing of self sustaining, independently operable vehicles with a detachable powered pusher. Many types of remote controlled vehicles are also known in the prior art but not in the combination of my invention. Recently, as retail stores have grown to use more shopping carts, there has arisen a need for a means of efficiently returning the carts to the store. In accordance with conventional terminology, the term nested shopping carts used herein may be taken to mean hand pushed, basket-type carts that nest within one another from front to rear. Such carts are commonly found in commercial retail establishments. Customers collect their purchases in these carts and then use them to carry the goods to their vehicles in the parking lot. Presently, when customers are through with the carts, they are often placed in collection areas, called "cart corrals", in the parking lot area. The carts are manually returned to the store, a few at a time, by store personnel. The expense of this labor is a drain on the store's profitability. A long nested string of such carts is easy to form but extremely difficult to manually manipulate. Recently, some powered means have been developed to assist in the process. However, all the known prior art suffers from disadvantages and problems which are solved by my unique article of manufacture. The following known prior art provides vehicles and components similar in nature. As will be seen, the simplicity and effectiveness of my invention is not rivaled in the prior art.

U.S. Pat. No. 5,082,074, issued to Horst Fischer on Jan. 21, 1992, shows a nested cart transport vehicle which is adapted to pull a string of shopping carts behind it. A winch and cable is required to secure the nested carts to one another before the operation begins. An external framework wraps around the outside of a cart thus increasing the effective width of the train of carts. By contrast, the instant invention pushes the carts, thus not requiring a winch and cable. In addition the present invention does not increase the effective width of the train of carts.

U.S. Pat. No. 4,771,840, issued to Keller on Sep. 20, 1988, shows a shopping cart pusher with a single driven wheel. The pusher wheel is articulated to the cart and the pusher vehicle has no means of support other than by using the cart wheels through the articulated joint. The patent requires the shopping cart to be modified by the attachment of the special articulation joint. By contrast, the instant invention is fully self supporting and requires absolutely no modification to the shopping carts to be pushed. In further contrast, the instant invention does not use an articulated joint.

U.S. Pat. No. 2,749,996, issued to Parker et al. on Jun. 12, 1956, shows a sweeper drive wheel raising means. The patent is only of interest for its teaching of a liftable drive wheel which is similar, but not identical, to one of the features of my overall combination. The patent is not directed to a device for pushing other vehicles and does not show any sort of inter-vehicle connection means. By contrast, the device of the instant invention is directed to a pushing vehicle for shopping carts thus requiring some sort of inter-vehicle connection means and actually having a very unique and specialized form of connection means.

German Patent No. DT 24 50 692, issued to Weller on Apr. 29, 1976, shows a modified fork lift truck with a remote control for pushing shopping carts. The inter-vehicle connection of the patent appears to be a dummy basket attached to the fork lift rails which inserts into one of the carts and the drive means is that of a conventional fork lift truck. By contrast, the device of the instant invention has a unique releasable connection means and a self-braking drive means which with a liftable drive wheel.

German Patent No. 23 50 308, issued to Wiedemann on Apr. 17, 1975, shows a three wheeled transporter for supermarket trolleys. The patent discloses a pyramid shaped nose section for fitting inside nested shopping carts. By contrast, the instant invention has automatic connecting means with releasable hooks for encircling the vertical posts of the shopping cart frame and providing lower based and more stable control.

It will be noted that none of the prior art devices provide the simplicity of operation and positive latching but easily releasable characteristics of the present invention.

None of the above inventions and patents, taken either singly or in combination, is seen to describe the instant invention as claimed.

SUMMARY OF THE INVENTION

Briefly, the invention comprises a powered pusher for trains of nested shopping carts. A main body portion has a central drive wheel powered by an electric motor through a worm gear transmission. Caster wheels support one end of the vehicle for ease of steering and easy manipulation of the pusher vehicle when it is not connected to the carts. A pair of normally raised wheels, on each side of the drive wheel, may be lowered to raise the drive wheel from the ground. A remote control allows the operator to manually guide the lead cart while operating the pusher vehicle speed with the remote control. The invention allows a single person to manipulate a long train of nested shopping carts with ease.

Accordingly, it is a principle object of the invention to provide a new and improved nested cart pushing device which overcomes the disadvantages of the prior art in a simple but effective manner.

It is a major object of this invention to provide a pushing device that is self-braking and will not normally coast when the power is not applied.

It is another object of the invention to provide a pushing device whose speed can be controlled from a remote position so as to allow the operator to be positioned at one end of a long train of nested carts while the pusher is located at the other.

It is another object of the invention to provide a pushing device that may be attached to a train of shopping carts without increasing the width of the train.

It is another object of the invention to provide a pushing device that is powered by a pollution free electrical motor and battery combination.

It is another object of the invention to provide a pushing device that is easily and automatically attached to the first cart of a row without any effort on the part of the operator.

It is another object of the invention to provide a pushing device that is easily detached from the first cart of a row by the simple expedient of a pull ring.

It is another object of the invention to provide a pushing device that requires no modification of an existing shopping cart for attachment thereto.

It is another object of the invention to provide a pushing device that provides a stable, non-articulated connection to the first cart of a row.

It is another object of the invention to provide a pushing device that connects to a shopping cart at a position well below the center of gravity of the cart so as not to provide any tipping force to the cart.

It is another object of the invention to provide a pushing device that has vertically movable latching devices for allowing the combination to easily traverse rough or undulating terrain.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
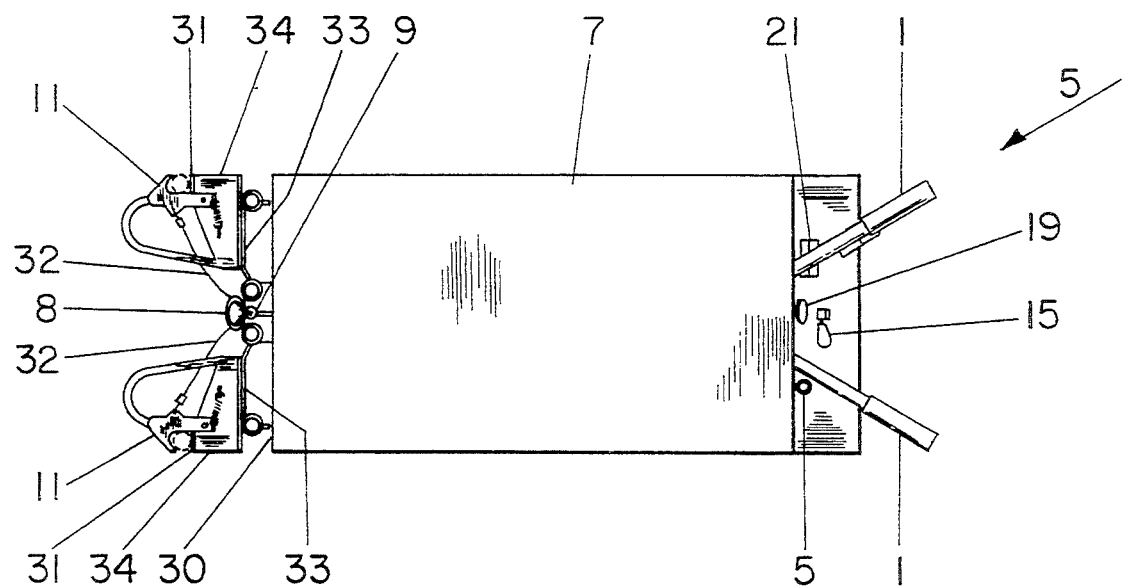
FIG. 1 is a top view of the pusher device of the invention showing the attachment to a pair of rear vertical posts of a shopping cart.
Figure 2:
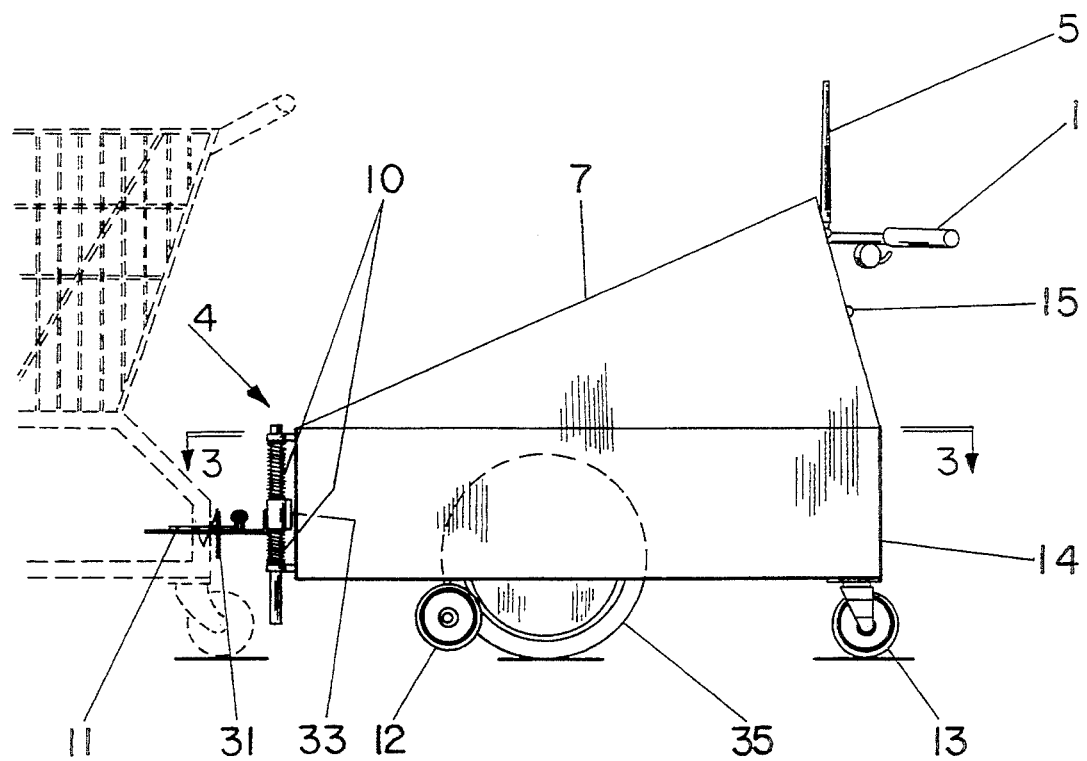
FIG. 2 is a side view of the pusher device of the invention showing an attached shopping cart in phantom lines.
Figure 3:
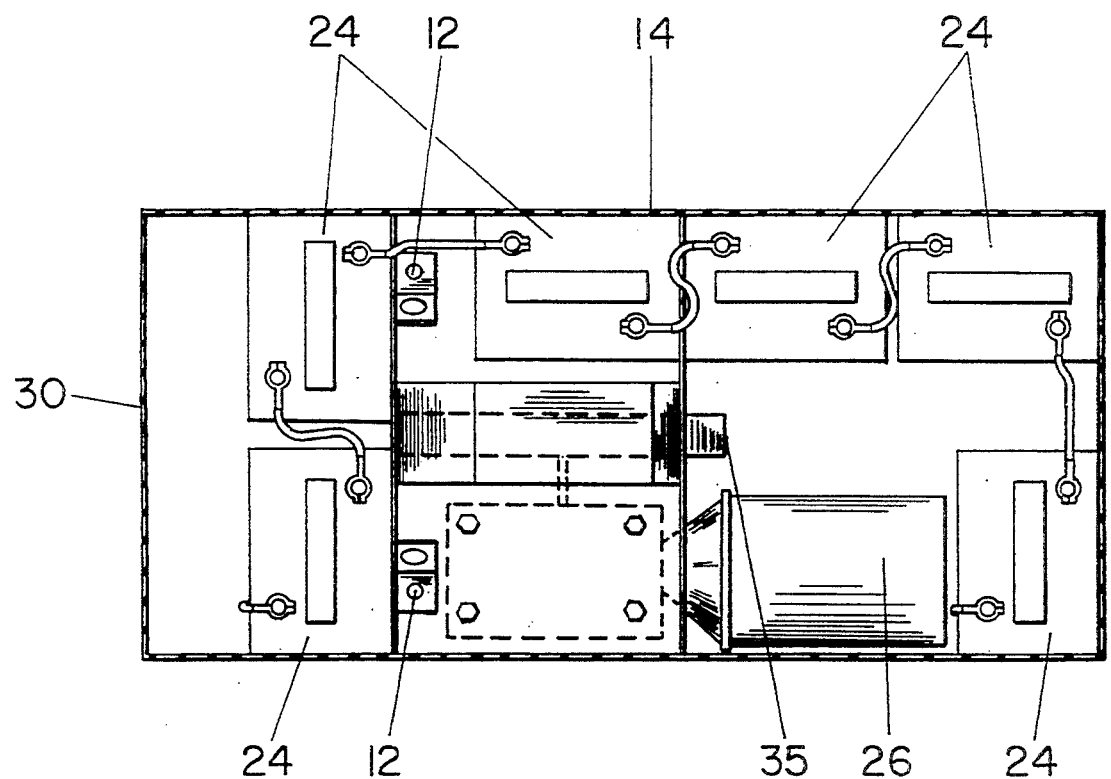
FIG. 3 is a cross-section taken along line 3—3 of FIG. 2 and illustrating the arrangement of the power source, drive train, and drive wheel.

The nested cart pusher of the present invention is seen from the top in FIG. 1 and the side in FIG. 2. The device comprises the following main parts; right and left latching means with hooks 11, main body and frame 7, central drive wheel 35, and power means (FIG. 3).

Figure 4:
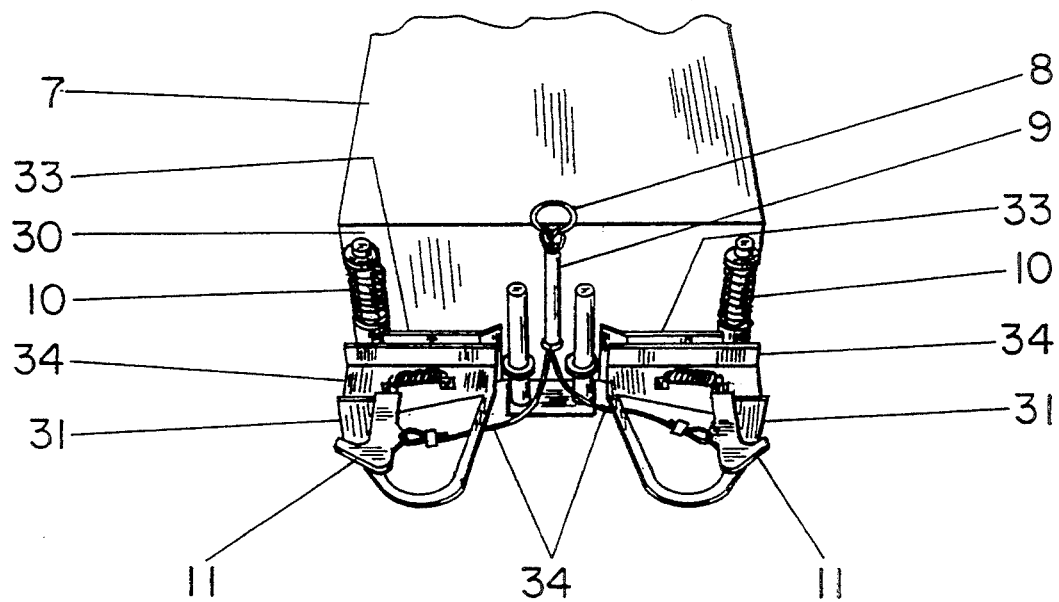
FIG. 4 is a partial perspective view of the front portion of the pusher device of the invention showing the front latching device and release mechanism.

Turning first to FIG. 2, cart pushing vehicle 7 is shown in its normal operating position connected to a shopping cart shown in dashed lines. Most existing shopping carts have a pair of vertically extending rear support members at the lower rear portion as seen in FIG. 2. I take advantage of this configuration by providing a guiding and latching means which slips inside these two vertical posts and latches firmly to them with latch members 11. Members 11 are pivoted at their rear portion to a mounting plate 34 and formed as hooks on their forward end to extend inside and around the vertically extending support members of the shopping cart. The forward nose of the hook portion is tapered so that as the hooks are brought forward into initial engagement with a pair of cart posts they will be forcibly pivoted inwardly toward one another. This pivoting motion is resisted by a bias spring connecting the far rear portion of members 11 to mounting plate 34 (most clearly shown in FIG. 4). As the forward motion continues the tapered portion of members 11 finally clears the recessed hook portion and the bias spring pivots members 11 outwardly and firmly captures the vertical posts of the shopping cart. The spring biased latch hooks thus make it simple to hook up to a shopping cart by merely driving up against the rear of the cart until the hook portion of the latching members snap into place. Mounting plate 34 has a vertical stop face 31 which abuts against the rear side of the cart post in the fully latched position.

To assist in positioning members 11 between the cart posts, the forward ends of mounting plate 34 are formed as U-shaped guide bars. These U-shaped guide bars present a broad, curved and tapered front edge to the shopping cart as it is approached by the pushing vehicle. This tends to guide and steer the pushing vehicle into a centered location as it approaches the shopping cart. The overall effect is a smooth and trouble free operation. Note the U-shaped guide bars can actually steer the vehicle as it approaches, because there is but a single central drive wheel, to be discussed later. This makes it possible to pivot easily the entire vehicle about the vertical axis through the drive wheel.

The mounting plate 34 is connected to bracket 31 which is mounted to vehicle frame 14 through a vertically movable spring biased collar which rides on vertical posts 10. The purpose of this arrangement is to allow some vertical motion to the latch members if needed to traverse undulating terrain. The artisan will see many other ways of accomplishing the same function.

Once the vehicle has been latched to the rear one of a train of shopping carts, the operator proceeds to the front of the train to manually steer the lead cart while operating the pushing vehicle with a remote control device shown only schematically by the presence of antenna 5. Details of the remote control are not given as the device is of conventional design. Suffice it to say the remote must be capable of controlling the speed, starting, and stopping of the electric drive motor.

Once the train of carts has been moved to its destination, the operator is ready to disengage the pusher vehicle and return for another load. This is accomplished by means of cables 34 attached at one end to latch members 11 and at the other end to pull ring 8. The cables pass through a vertical guide tube 9. A simple tug on the pull ring will pivot the latch members out of engagement with the cart posts and allow the pushing vehicle to be backed away.

Having described the novel coupling and uncoupling mechanism of the invention, the overall aspects of the pusher vehicle and its power means will be discussed. The vehicle has a lower main frame portion 14 and upper body portion 7. Body portion 7 is sloped so as to provide drainage of rain water and serves to seal the interior components from the weather. Lower main frame portion is constructed of heavy gage material for strength as well as weight. A heavy weight is desirable to allow single drive wheel 35 to develop an appreciable amount of tractive force. The overall frame is narrow enough to pass through any opening large enough to pass a shopping cart.

The drive train is best seen in FIG. 3 and includes batteries 24 arranged around the centrally located drive wheel 35 for weight balance. The six 6-volt batteries are shown connected in series to supply 36 volts to electric motor 26, although this is obviously not the only arrangement possible. Motor 26 is connected to drive wheel 35 through a right angle transmission. The transmission includes a worm gear (not shown) to provide large torque output and automatic braking as is well known with worm gear drives. The details of the transmission are conventional and not necessary to describe here. Suffice it to say that, when battery power is removed from motor 26, a torque on wheel 35 will not be sufficient to allow the vehicle to coast. This is useful if it is desired to park a long chain of shopping carts on a slope. However, in case of battery failure, it will be found to be impossible to move the pushing vehicle. To solve this problem I provide two liftable wheels or wheel jacks 12, one on each side of the main drive wheel. The wheels on wheel jacks 12 do not normally contact the ground. In an emergency, however, the wheel jacks can be lowered to raise the main drive wheel 35 from the ground. With wheel jacks lowered the vehicle is easily maneuvered on the wheel jack wheels and the rear caster wheels.

Figure 5:
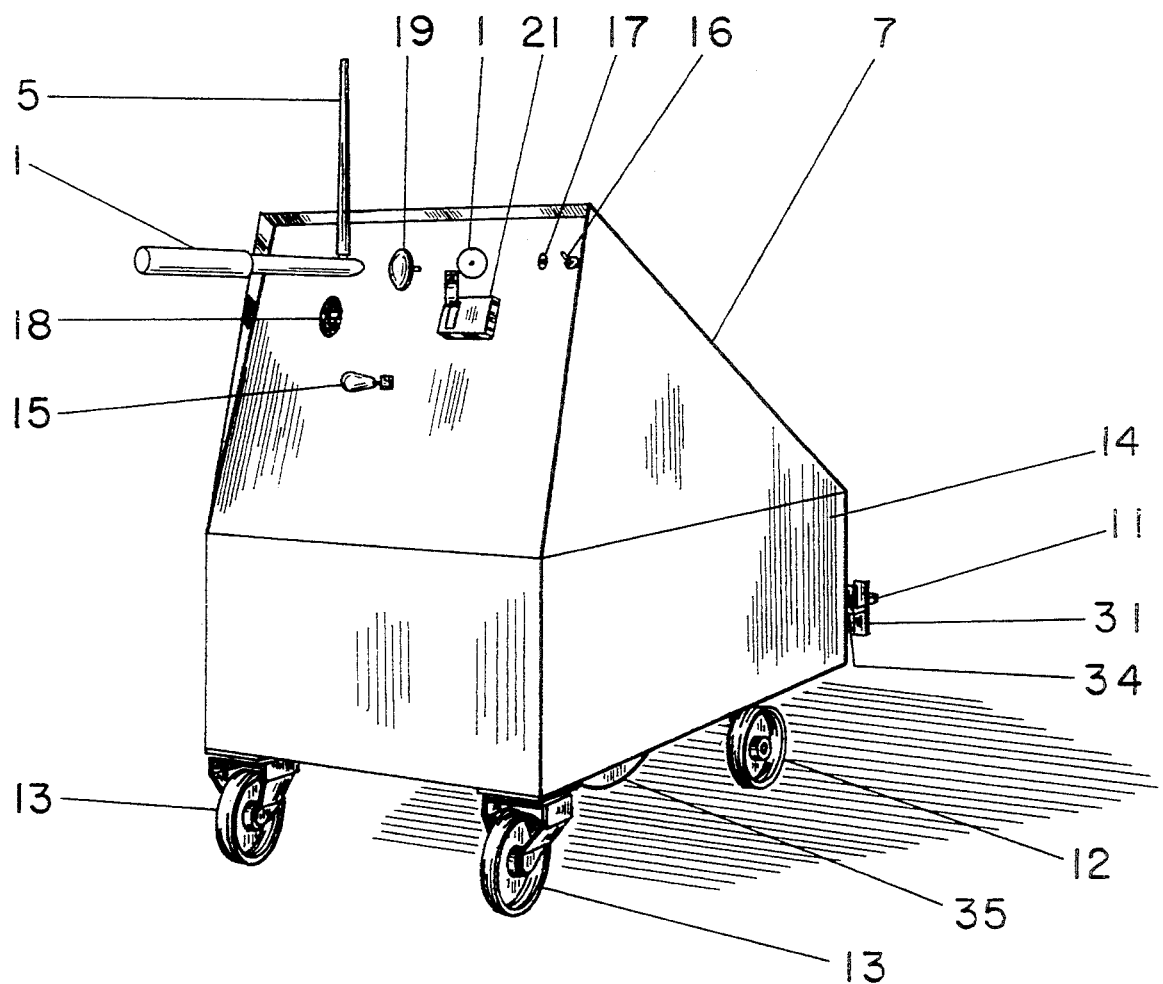
FIG. 5 is a perspective view of the overall pusher device as seen from the rear.

The pusher vehicle has several miscellaneous control features which will now be described primarily with regard to FIG. 5. Of course, batteries will eventually need to be recharged and I provide recharging plug 18 for this purpose. The motor will need to be reversed upon occasion and reversing switch 15 is provided for that purpose. Reverse switch 15 is also arranged to activate a warning beeper when the vehicle is in reverse for safety. Safety bump switch 19 is provided for emergency shutoff. Key switch 17 is a main on-off control preventing operation by unauthorized personnel. Toggle switch 17 is provided to toggle the operation of the device between remote and direct modes. The toggle assures both modes will not be used simultaneously. Gauge 21 is provided to indicate the state of charge of the batteries. Handles 21 are used to maneuver the vehicle in the direct control mode. The internal workings of all these miscellaneous controls are well known and not further described here.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, the artisan could easily rearrange the control panel and provide more or fewer conventional control features.

It is to be understood that the present invention is not limited to the sole embodiment described above, but encompasses any and all embodiments within the scope of the following claims:

I claim:

1. A vehicle for moving a plurality of nestable shopping carts while in a nested position, each cart having a plurality of wheels and a frame which includes a pair of vertically extending rear support members which are laterally spaced apart, the vehicle comprising:
   a main body portion;
   a centrally located drive wheel extending below said body portion;
   a motor connected to said drive wheel for propelling said vehicle;
   a caster for supporting a rearward end of said vehicle;
   a wheel assembly located adjacent to and forwardly of said drive wheel, said wheel assembly including a pair of wheels and means for raising and lowering said pair of wheels into and out of engagement with a supporting surface for moving said drive wheel into and out of engagement, respectively with respect to the supporting surface; and,
   automatic connecting means for connecting said vehicle to a rearmost one of the nested shopping carts, said connecting means including a pair of laterally spaced latch members attached by bracket means to a forward end of said vehicle, each latch member having a U-shaped guide bar with rearwardly extending inner and outer legs, a latching hook overlying an outer leg of the guide bar, the latching hook having a longitudinally extending portion which is pivotally mounted at a rearward end and a hook portion extending outwardly and rearwardly from a forward end of said longitudinally extending portion, said hook portion having a forwardly facing surface for engaging a respective one of the vertically extending rear support members of the cart and a rearwardly facing surface for retaining the respective rear support member, spring means for biasing the latching hook into a latching position, and a separate cable connected at one end to the forward portion of each hook and at an opposite end to a common actuator ring for permitting simultaneous movement of the latching hooks into a release position.

2. A vehicle according to claim 1, wherein said motor comprises an electric motor which is connected to said drive wheel by means of a worm drive gear box.

3. A vehicle according to claim 1, wherein said latch members are connected to vertical rods located on said bracket means for permitting vertical movement of said latch members relative to said vehicle.

4. A vehicle according to claim 3, wherein said bracket means includes springs located on said vertical rods, above and below each of said latch members, for controlling the vertical movement of said latch members.

5. A vehicle according to claim 1, wherein the vehicle includes handles connected to a rearward end of the main body portion.

* * * * *